United States Patent
Boyd

(12) 
(10) Patent No.: US 6,276,466 B1
(45) Date of Patent: Aug. 21, 2001

(54) SYSTEM FOR MEASURING THE DIRECTION AND REVOLUTION OF A PRODUCTION STRING

(76) Inventor: Anthony R. Boyd, 2204 Turnberry Dr., Loreauville, LA (US) 70552

( * ) Notice: Subject to any disclaimer, the term of this patent is extended or adjusted under 35 U.S.C. 154(b) by 0 days.

(21) Appl. No.: 09/429,792

(22) Filed: Oct. 29, 1999

(51) Int. Cl.[7] ........................... E21B 47/00
(52) U.S. Cl. .............. 175/40; 166/250.01; 73/152.59
(58) Field of Search ............... 175/40; 73/152.59, 73/152.01; 166/250.01

(56) References Cited

U.S. PATENT DOCUMENTS

| | | | |
|---|---|---|---|
| 3,774,445 | 11/1973 | Rundell et al. | 73/151 |
| 4,099,410 | 7/1978 | Martin | 73/151.5 |
| 4,715,451 * | 12/1987 | Bseisu et al. | 175/40 |
| 4,756,188 | 7/1988 | Fennell | 73/151 |
| 4,802,143 | 1/1989 | Smith | 367/82 |
| 4,831,871 | 5/1989 | Malinet et al. | 73/151.5 |
| 5,202,680 | 4/1993 | Savage | 340/853 |
| 5,205,163 * | 4/1993 | Sananikone | 73/151 |
| 5,272,925 | 12/1993 | Henneuse et al. | 73/862 |
| 5,347,859 | 9/1994 | Henneuse et al. | 73/151 |

* cited by examiner

Primary Examiner—William Neuder

(74) *Attorney, Agent, or Firm*—Garvey, Smith, Nehrbass & Doody, LLC

(57) ABSTRACT

A sensing system mounted to a mechanical drill pipe swivel of the type which is mounted on a rig housing to a section of drill pipe. The swivel would include an enlarged body portion for securing to a section of drill pipe. There would be provided a first upper circular collar positionable around the outer surface of the swivel, the collar having a first and second halves hinged at a common edge, so that the collar may move to a first open position to be engaged around the body of the swivel and moved to a second closed position to be locked in place around the swivel body. The collar would include an arm member extending from the collar wall on a first end, to a position so that the second end of the arm member is in line with a portion of the drill pipe to which the swivel is engaged. The second end of the arm member would include first and second sensors positioned facing the section of drill pipe. The section of drill pipe would further include a second lower collar, again having first and second half portions and hinged at a common edge so that the second collar could be placed in a first open position around the surface of the drill pipe and moved to a second closed position to be locked in place. The second collar would include a plurality of two types of sensors which would be positioned at specific points along the wall of the collar. As the drill pipe rotated, there would be a first set of sensors aligned with one of the sensors on the arm member for sensing the direction of the rotation, and a second set of sensors aligned with the second sensor on the arm member for sensing the number of revolutions of the drill pipe as it turned in a 360 degree turn.

11 Claims, 2 Drawing Sheets

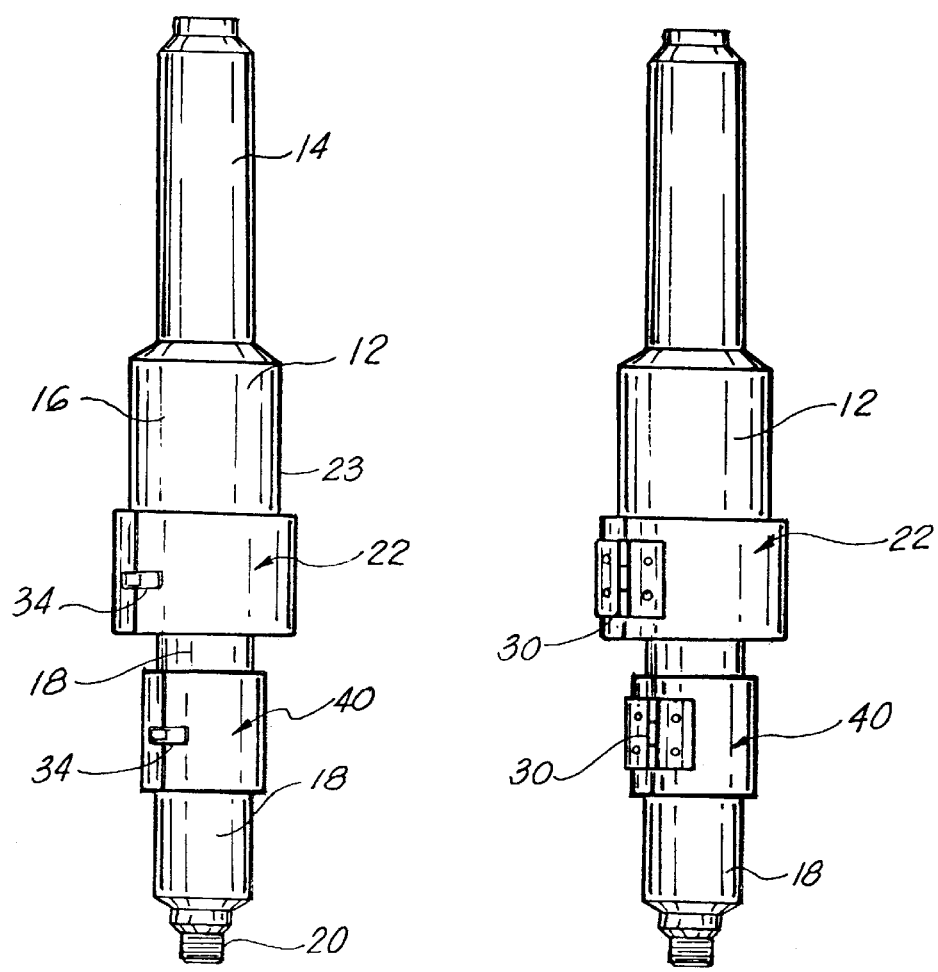
FIG. 1
FIG. 2
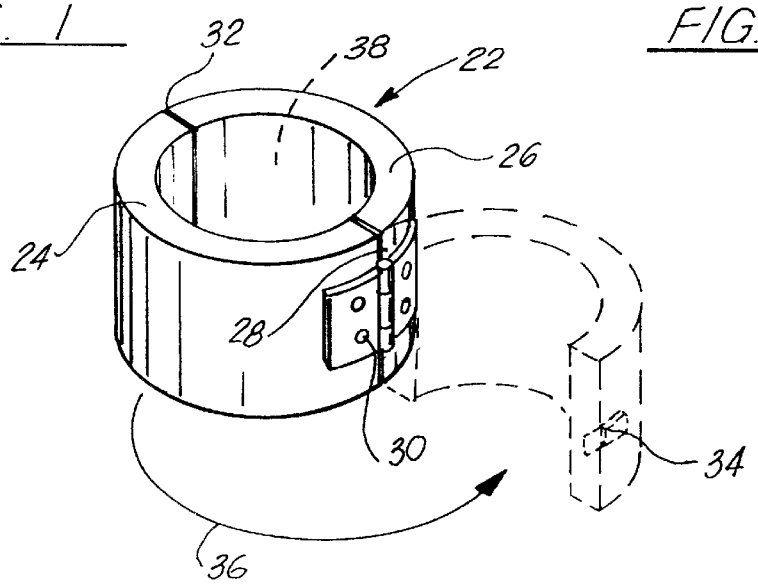
FIG. 3

SYSTEM FOR MEASURING THE DIRECTION AND REVOLUTION OF A PRODUCTION STRING

CROSS-REFERENCE TO RELATED APPLICATIONS

Not applicable

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The system of the present invention relates to oil well drilling and production. More particularly, the present invention relates to a system for monitoring both the direction of a drill string and the number of revolutions made by the drill string over a given time during back off or fishing operations.

2. General Background of the Invention

In the present state of the art, in the drilling of oil wells and the production of hydrocarbons, there are many tasks which have to be undertaken during the rather complex process, which requires that the operator of the rig know at all times certain features of the string. For example, during back off of the drill string during drilling, it is necessary that the number of revolutions that the drill string makes during the back off be monitored very carefully so as to be able to calculate the proper amount of torque that is needed during the back off work. Secondly, it is important that the operator on the rig floor know the direction i.e. clockwise or counter-clockwise that the drill string is rotating during operations such as back off work, or during fishing operations.

One of the more common systems of counting the revolutions that a drill string makes is to simply tie a piece of cloth or the like on the drill pipe or on the kelly and as the kelly rotates, the cloth would strike a worker or the like on the leg and the worker would keep count of the number of revolutions made during a particular given time. Although this is a quite primitive way of counting revolutions, it is often the only manner of counting revolutions of a drill string that it is used in such a system.

Therefore, there is a need in the art for a system that is able to be a reliable yet precise system of counting the revolutions made by, for example, a drill pipe during operations conducted on a rig, and to sense the direction that the drill pipe is rotating so as to ascertain whether the drill string is turning clockwise or counter-clockwise as the case may be.

In a search conducted of the art in this field, there are several patents which were found that may be pertinent to the art and these patents are included herewith in a prior art statement submitted with this patent application.

BRIEF SUMMARY OF THE INVENTION

The system of the present invention solves the problems in the art in a simple and straightforward manner. What is provided is sensing system mounted to a mechanical drill pipe swivel of the type which is mounted on a rig housing to a section of drill pipe. The swivel would include an enlarged body portion for securing to a section of drill pipe. There would be provided a first upper circular collar positionable around the outer surface of the swivel, the collar having a first and second halves hinged at a common edge, so that the collar may move to a first open position to be engaged around the body of the swivel and moved to a second closed position to be locked in place around the swivel body. The collar would include an arm member extending from the collar wall on a first end, to a position so that the second end of the arm member is in line with a portion of the drill pipe to which the swivel is engaged. The second end of the arm member would include first and second sensors positioned facing the section of drill pipe. The section of drill pipe would further include a second lower collar, again having first and second half portions and hinged at a common edge so that the second collar could be placed in a first open position around the surface of the drill pipe and moved to a second closed position to be locked in place. The second collar would include a plurality of two types of sensors which would be positioned at specific points along the wall of the collar. As the drill pipe rotated, there would be a first set of sensors aligned with one of the sensors on the arm member for sensing the direction of the rotation, and a second set of sensors aligned with the second sensor on the arm member for sensing the number of revolutions of the drill pipe as it turned in a 360 degree turn.

Further, there would be included a receiver which would be electronically attached to the arm member so that when the sensors on the end of the arm member received a signal from the direction sensors or counter sensors on the drill pipe, the receiver would receive this information and translate it into a digital format so that a person on the rig could see both the number of revolutions made by the drill pipe on the face of the receiver and the direction of the drill pipe as it rotated either clockwise or counter-clockwise.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein:

FIG. 1 illustrates an overall view of the first and second collar members engaged around a swivel and a drill pipe respectively;

FIG. 2 illustrates an overall view of the first and second collar members engaged around a swivel and drill pipe with the hinged edge of the collars illustrated;

FIG. 3 illustrates an overall view of a sample collar of the type used around the swivel or drill pipe.

DETAILED DESCRIPTION OF THE INVENTION

Figure 4:
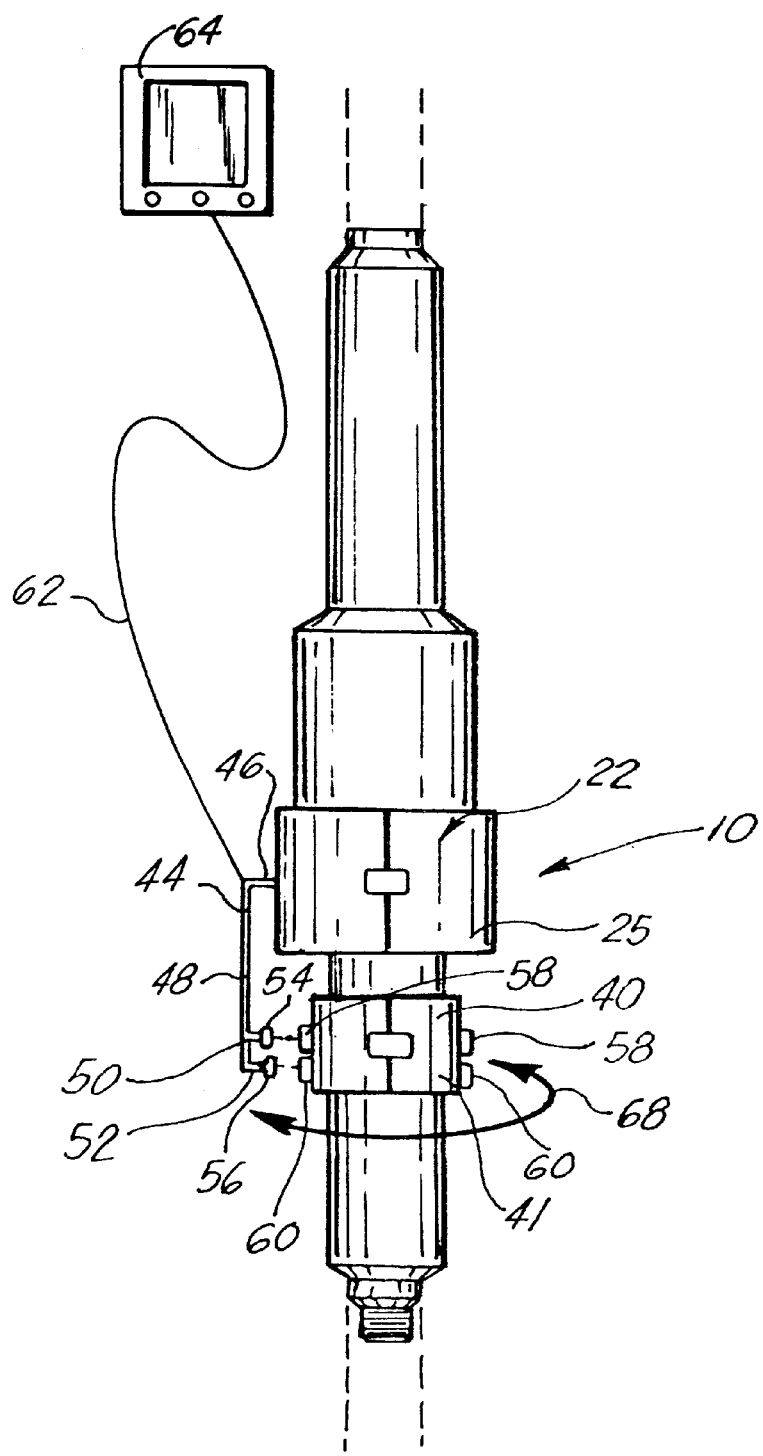
FIG. 4 illustrates an overall view of the first and second collars during the operation of the drilling system wherein signals are sent to a receiver for recordation.

FIGS. 1–4 illustrate the preferred embodiment of the system of the present invention, with FIG. 4 illustrating an overall view of the present invention illustrated by the numeral 10. However, prior to a discussion of the overall invention, reference is made to FIGS. 1–3 which illustrate the individual components of the present invention as utilized in the system. Turning first to FIG. 1, there is illustrated a top drive swivel 12 of the type having an upper body portion 14 and an enlarged body portion 16 for engaging around a section of drill pipe 18 there below. The drill pipe 18 would have an end portion 20 which would of course engage into a subsequent section of drill pipe and continue down to make a complete string for drilling or recovery. As seen further in FIG. 1, there is illustrated a first upper enlarged collar member 22, the collar member 22 being of the type as illustrated in FIG. 3.

In FIG. 3, collar member 22 is shown having a first half portion 24, a second half portion 26, each of the half portions engaged at a common edge 28 via a hinge member 30. The second edge 32 of the collar members would be held together via a lock 34 (phantom view) and could move from the first closed position as seen in FIG. 3 to the second open position as seen phantom view in FIG. 3 with it opening in the direction of arrow 36.

As seen in FIG. 1, this collar 22 has been placed around the outer surface 23 of the drill pipe swivel 12, and has been engaged around the outer surface via lock 34. For purposes of construction, the collar 22 would have a central opening 38 which would be substantially the same size as the outer diameter wall of the swivel 12 so that when it is locked in place as seen in FIG. 1, it is held securely around the upper drill swivel 12.

Likewise, as seen in FIG. 1, there is a second lower smaller collar 40 which again is the type which is constructed identically to collar 22 as seen in FIG. 3 and again having a lock 34 as illustrated in FIG. 1. The only difference between collar 40 and 22 is the internal diameter 38 of collar 40 is smaller in that it must engage around the smaller drill pipe 18 as the larger one 22 engages around the swivel 12. As seen in FIG. 2, there is simply illustrated that portion of each of the collars 22 and 40 which show the hinge member 30 of each engaged around so that each of the collars 22, 40 are hingedly closed around the swivel 12 and type 18 respectively in the same manner as seen in FIG. 1.

Turning now to FIG. 4, reference is made to the entire system. As seen in FIG. 4, which is not illustrated in FIGS. 1 and 2, is the fact that the upper collar 22 includes an arm member 44 which is engaged at a first end 46 to the wall 25 of collar 22, with arm member 44 extending out from the wall having a vertical section 48 which terminates in a pair of arm sections 50, 52. Each of the arms 50 and 52 are directed inwardly towards the lower collar 40 as seen in FIG. 4, and each includes a sensor 54, and 56 respectively. For purposes of construction, the sensor 54 could be provided as a sensor which senses the direction of rotation of the pipe, while the sensor 56 could be provided as a sensor which senses the number of revolutions of the drill pipe. These types of sensors are known in the art and can be obtained individually.

As seen further illustrated in FIG. 4, the lower collar 40 has a wall portion 41. The wall portions 41 includes a series of receiving sensors 58 which would be aligned on the same plane as sensor 54 on arm 50 for sensing direction of rotation. Also, there is seen a second series of receiving sensors 60 on the wall 41 of collar 40 which would be aligned with lower sensor 56 on arm 52 for sensing the number of revolutions of pipe 18 as seen by arrow 68. As further illustrated, there is an electrical cable 62 extending from the arm 44 to a receiver 64 of the type that may be known in the art with the receiver having the ability to provide and operate on the rig with digital read outs of certain functions of the system.

During operation, as the drill pipe rotates, when a sensor 58 crosses the path of the upper sensors 54, there is a signal emitted which is transferred to the receiver 64 and may, for example, read out as a digital reading, either clockwise or counter-clockwise or rotation left or rotation right, as the case may be. Likewise, also as part of the system, each of the lower sensors 56 which are secured to the lower portion 52 of arm 44 have the ability to receive a signal as to the number of revolutions that the drill pipe is turning. This is provided in that there are a pair of lower sensors 60 secured to the wall 41 of the collar 40. Likewise, as the drill pipe is rotating, when one of the sensors 60 is aligned with one of the sensors 56 during the rotation, a signal is emitted through cable 62 to the receiver 64 which is then transformed to a digital read out in the form of a counter which would then count numerically the number of revolutions that the drill pipe is turning during operation.

Although the system is seen with the system of sensors, as indicated, the overall point of the invention is to have an electrical means for achieving two specific tasks while the drill pipe is undergoing either back off operations or fishing jobs and that is (a) the direction in which the drill pipe is rotating during the operation and (b) the number of revolutions that the drill pipe is making during that job so as to allow the operator on the rig to establish certain criteria as toward the amount of torque, etc., which may be required during certain jobs. It is foreseen that this system of sensors may not be precisely as indicated in the number of sensors shown in the drawings but would be in effect an equivalent system which would allow this type of counting or the collection of this type of data with this system.

A second embodiment of the system would be utilized when a kelly is used on the rig floor instead of a drill pipe swivel. In that case, the sensors 54, 56 would be positioned on a tripod on the rig floor adjacent the kelly bushing. The kelly pushing would have a series of sensors 58, 60 on its wall, so that as the kelly is rotating, the sensors 58, 60 on the kelly bushing would move by the sensors 54, 56 on the rig floor, and the receiver would receive the signals and record the number of revolutions of the kelly over a given time, and the direction of rotation, in the same manner as described above in the principal embodiment.

The foregoing embodiments are presented by way of example only; the scope of the present invention is to be limited only by the following claims.

What is claimed is:

1. A system for measuring the direction and revolutions of a drill string, comprising:
 a. a stationary drive swivel mounted on a rig;
 b. a drill pipe rotationally secured to the stationary swivel;
 c. a sensor arm mounted on the stationary swivel;
 d. a plurality of directional and counter sensors mounted on the drill pipe;
 e. directional and counter sensors mounted on a second end of the sensor arm and extending to a point adjacent the plurality of directional and counter sensors mounted on the drill pipe;
 f. means for recording the direction and number of revolutions made by the drill pipe as the drill pipe sensors cross the path of the sensors mounted on the sensor arm during rotation of the drill pipe.

2. The system in claim 1, wherein the sensor arm is mounted to a removable collar secured around the wall of the stationary drive swivel.

3. The system in claim 1, wherein the plurality of sensors on the drill pipe are secured to a removable collar secured around the wall of the drill pipe.

4. The system in claim 1, wherein the means for recording further comprises an electrical receiver having a digital readout capacity for allowing a person to read the direction of rotation and number or revolutions of the drill pipe over a given period of time.

5. A system for measuring the direction and revolutions of a drill string comprising:
   a. a stationary drive swivel mounted on a rig;
   b. a drill string rotationally secured to the stationary swivel;
   c. a first removable collar member secured around the wall of the drive swivel;
   d. a sensor arm mounted on the first removable collar member;
   e. a second removable collar member secured to the section of drill pipe wall below the drive swivel;
   f. a plurality of directional and counter sensors mounted on the second removable collar member;
   g. directional and counter sensors mounted on a second end of the sensor arm and extending to a point adjacent the plurality of directional and counter sensors mounted on the drill pipe;
   h. digital readout means for recording the direction and number of revolutions made by the drill pipe as the drill pipe sensors cross the path of the stationary sensors during rotation of the drill string.

6. The system in claim 5, wherein the first and second collar members are lockedly secured around the drive swivel and drill pipe and can be removed when out of use.

7. The system in claim 5, wherein the system is used during back off or fishing operations.

8. The system in claim 5, wherein the signals received by the sensors are recorded and appear as digital readouts for a person to monitor on the rig floor.

9. A system for measuring the direction and revolutions of a drill string, comprising:
   a. a stationary drive swivel mounted on a rig;
   b. a drill or production pipe rotationally secured to the stationary swivel;
   c. a first means secured around the wall of the drive swivel;
   d. a sensor arm mounted on the first means;
   e. a second means secured to the drill pipe wall below the drive swivel;
   f. a plurality of directional and counter sensors mounted on the second means;
   g. directional and counter sensors mounted on a second end of the sensor arm and extending to a point adjacent the plurality of directional and counter sensors mounted on the drill pipe;
   h. digital readout means for recording the direction and number of revolutions made by the drill string as the drill pipe sensors cross the path of the stationary sensors during rotation of the drill string.

10. The system in claim 9, wherein the first means comprises a removable collar mounted around the wall of the stationary swivel.

11. The system in claim 9, wherein the second means comprises a removable collar mounted around the wall of the drill pipe directly below the drive swivel.

* * * * *